INVENTOR.
Dennis Daniels

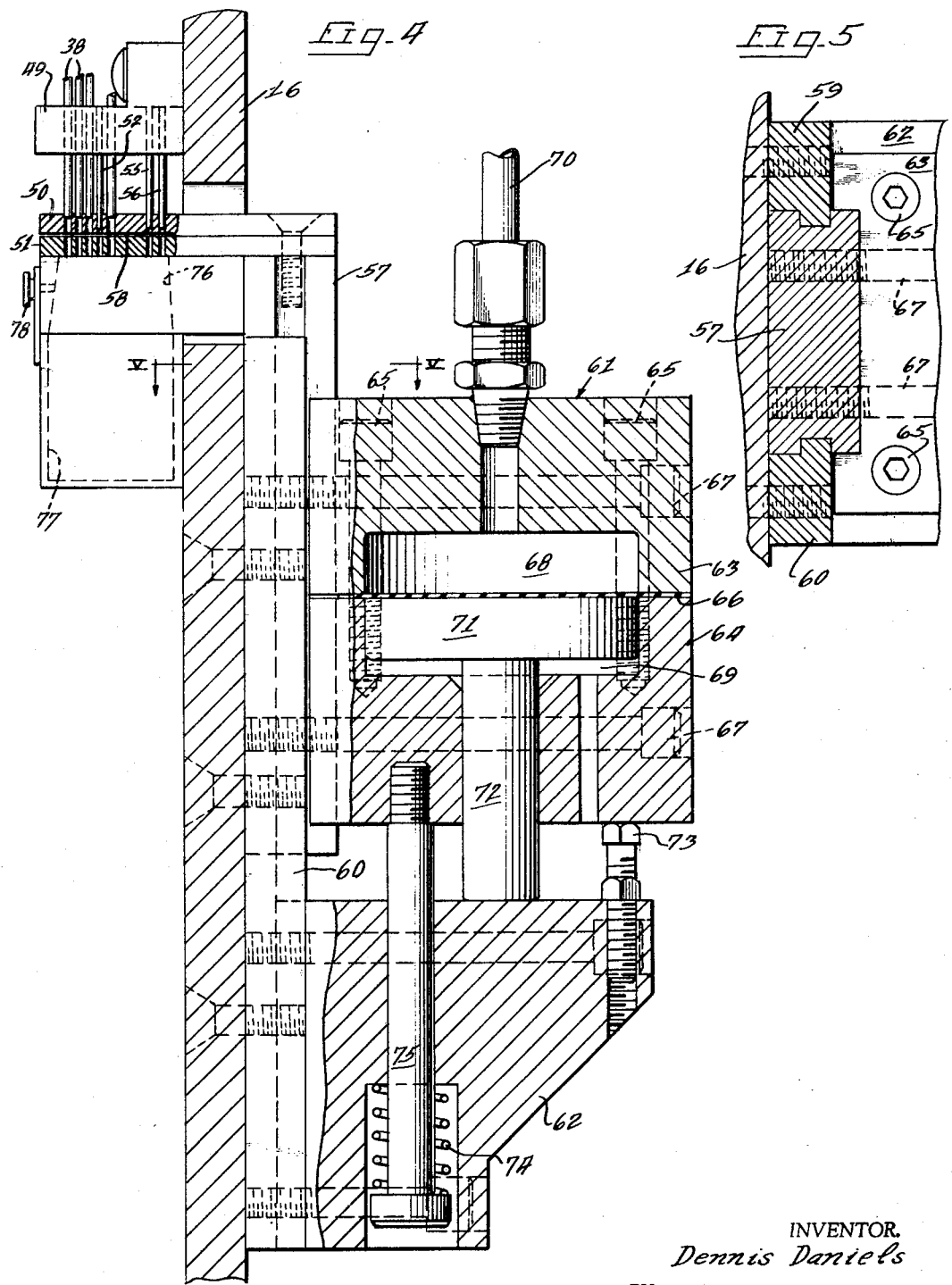

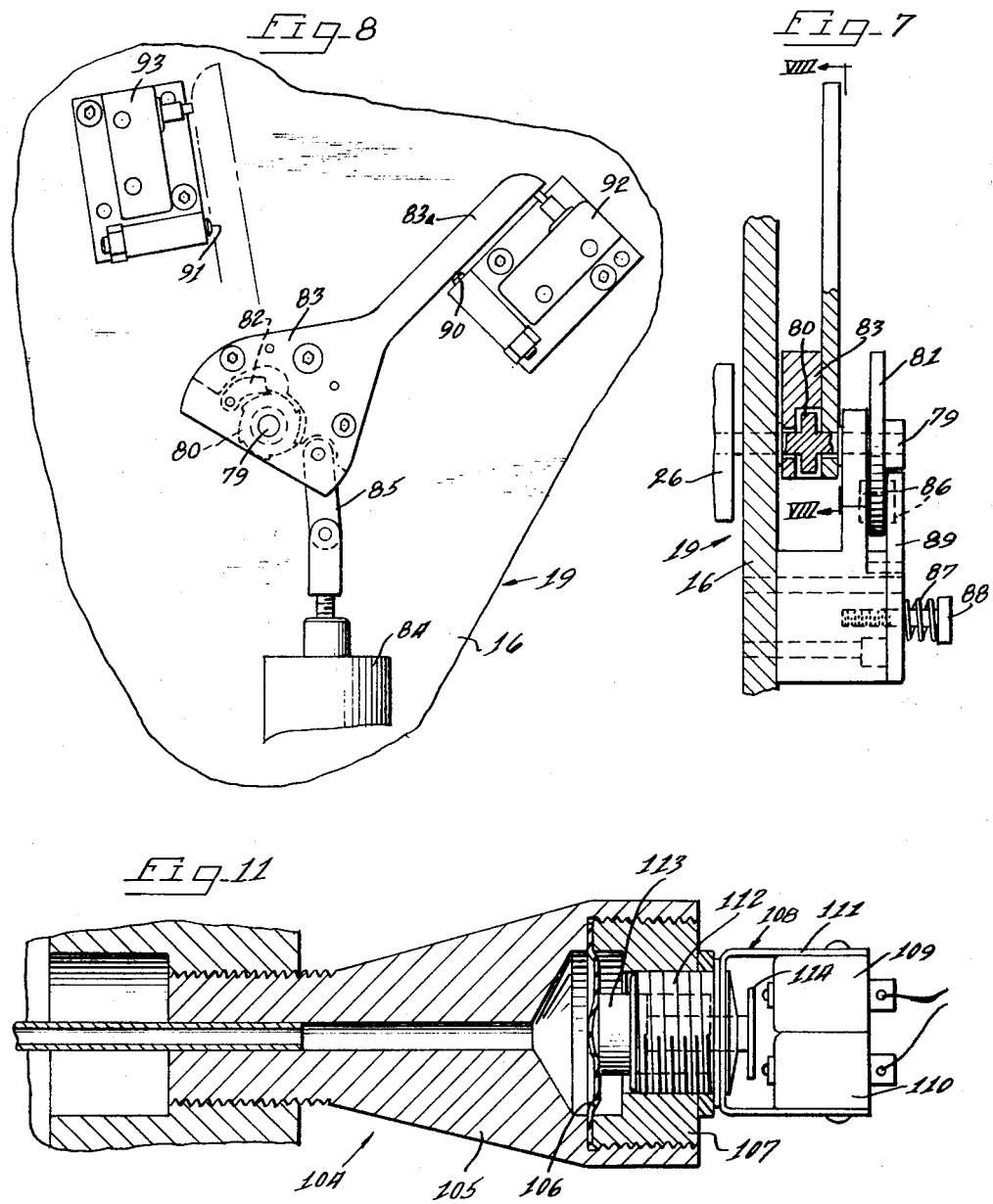

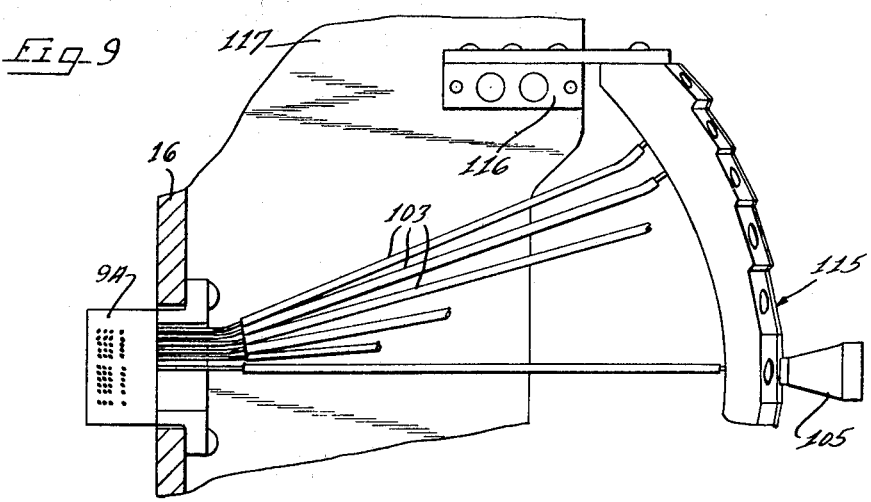
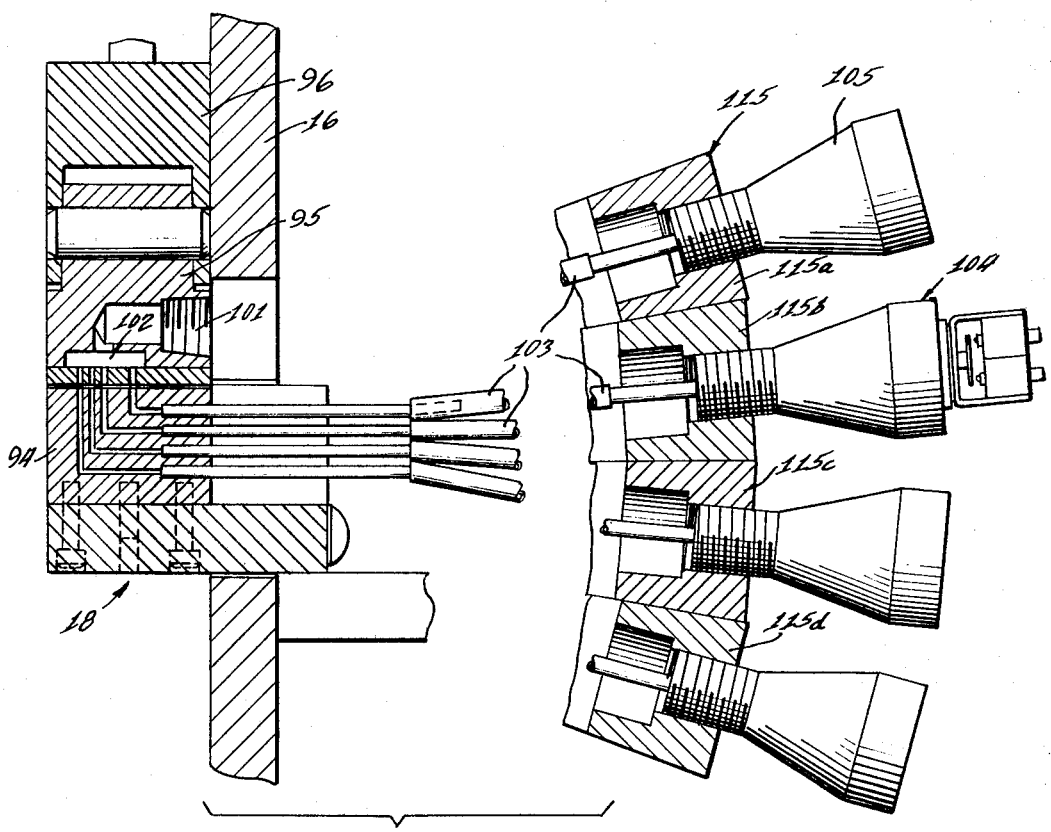

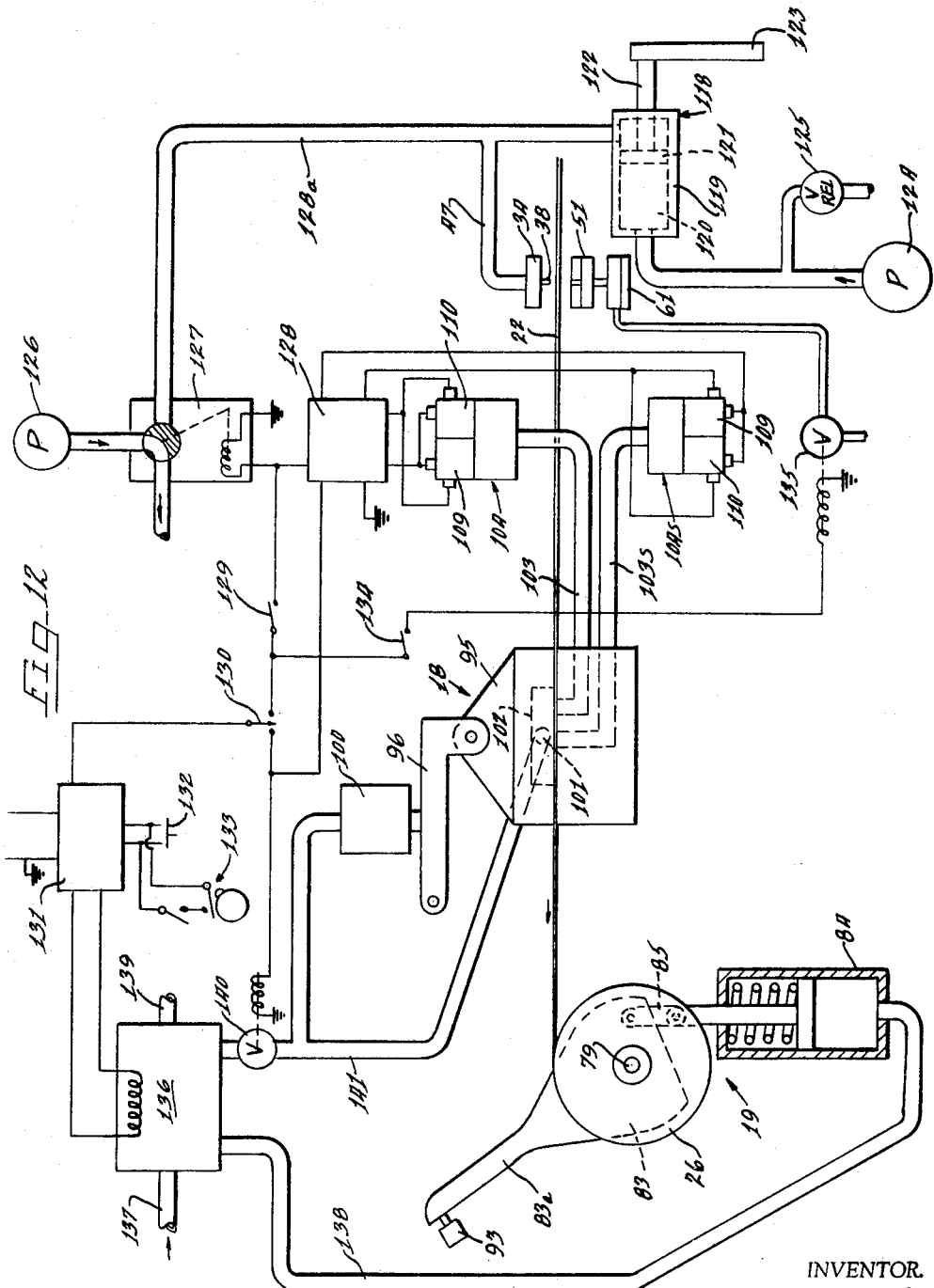

United States Patent Office 3,509,323
Patented Apr. 28, 1970

3,509,323
TAPE CONTROL DEVICE
Dennis Daniels, Williamsville, N.Y., assignor to Houdaille Industries, Inc., Buffalo, N.Y., a corporation of Michigan
Filed May 17, 1962, Ser. No. 195,599
Int. Cl. B26f 1/02; G06k 1/08, 7/04
U.S. Cl. 235—61.1                8 Claims

ABSTRACT OF THE DISCLOSURE

A control-tape device for a machine tool includes a tape perforator adapted to be fluidly connected to the machine tool for sensing and recording the various machine tool functions, certain punches being flexible and having driven ends that converge, other punches being fixedly supported, an alternatively used tape reader for controlling such machine tool functions, the reader including pressure switches whose axes converge and which have a uniform length of pressure lines, and a single intermittent tape drive for moving tape through both the tape perforator and the tape reader.

---

This invention relates generally to tape control devices, and more specifically to an improved punching device incorporated therein.

Although the principles of the present invention may be included in various devices, a particularly useful application is made in a control-tape attachment for a machine tool.

It has been known heretofore that a machine tool can be automatically operated by a control mechanism adapted to employ a coded perforated tape for sequentially operating various machine functions. Such tapes have been prepared by an encoding mechanism and thereafter transferred to the control-tape device of the machine tool for regulating the operation of the same.

The present invention contemplates the utilization of a control-tape device or attachment which will selectively either record machine operations on a tape or will cause the machine to be operated in accordance with the code perforated in a previously made tape. By way of example, an operator may manually operate a machine tool equipped with this invention through a selected series of steps or functions which will all be faithfully recorded by the device of this invention, after which the device of this invention will use the tape thus made to cause the machine tool to repeat the same sequence of functions as many times as may be required as well as at any future period.

Accordingly, it is an object of the present invention to provide an improved control-tape device.

Another object of the present invention is to provide a control-tape device which will be selectively driven by or drive any multiple function machine with which it is associated.

Yet another object of the present invention is to provide an improved punching mechanism.

A still further object of the present invention is to provide a punching mechanism employing flexible punches which are interchangeable with each other.

A still further object of the present invention is to provide a control-tape device having multiple reading channels each of which has a substantially constant reaction time.

Many other advantages, features and additional objects of the present invention will become manifest to those versed in the art upon making reference to the detailed description and to the accompanying sheets of drawings in which a preferred structural embodiment incorporating the principles of the present invention is shown by way of illustrative example.

On the drawings

FIGURE 4 is an enlarged cross-sectional view taken along IV—IV of FIGURE 1 illustrating further punching mechanism details;

FIGURE 5 is a cross-sectional view taken along line V—V of FIGURE 4;

FIGURE 7 is an enlarged cross-sectional view taken along VII—VII of FIGURE 1 showing an intermittent tape drive mechanism, with parts thereof omitted for clarity;

FIGURE 8 is an elevational view taken along line VIII—VIII of FIGURE 7;

FIGURE 9 is a slightly enlarged plan view taken along line IX—IX of FIGURE 1, partly in cross section, with certain duplicated parts and portions broken away, showing a tape reading mechanism;

FIGURE 10 is an enlarged cross-sectional view taken along X—X of FIGURE 1 showing further details of the tape reading mechanism with portions thereof broken away;

FIGURE 11 is an enlarged cross-sectional view of a portion of FIGURE 10; and

FIGURE 12 is a schematic diagram illustrating how one perforating and reading channel of the device of FIGURE 1 may be connected to a machine tool.

As shown on the drawings

Figure 1:
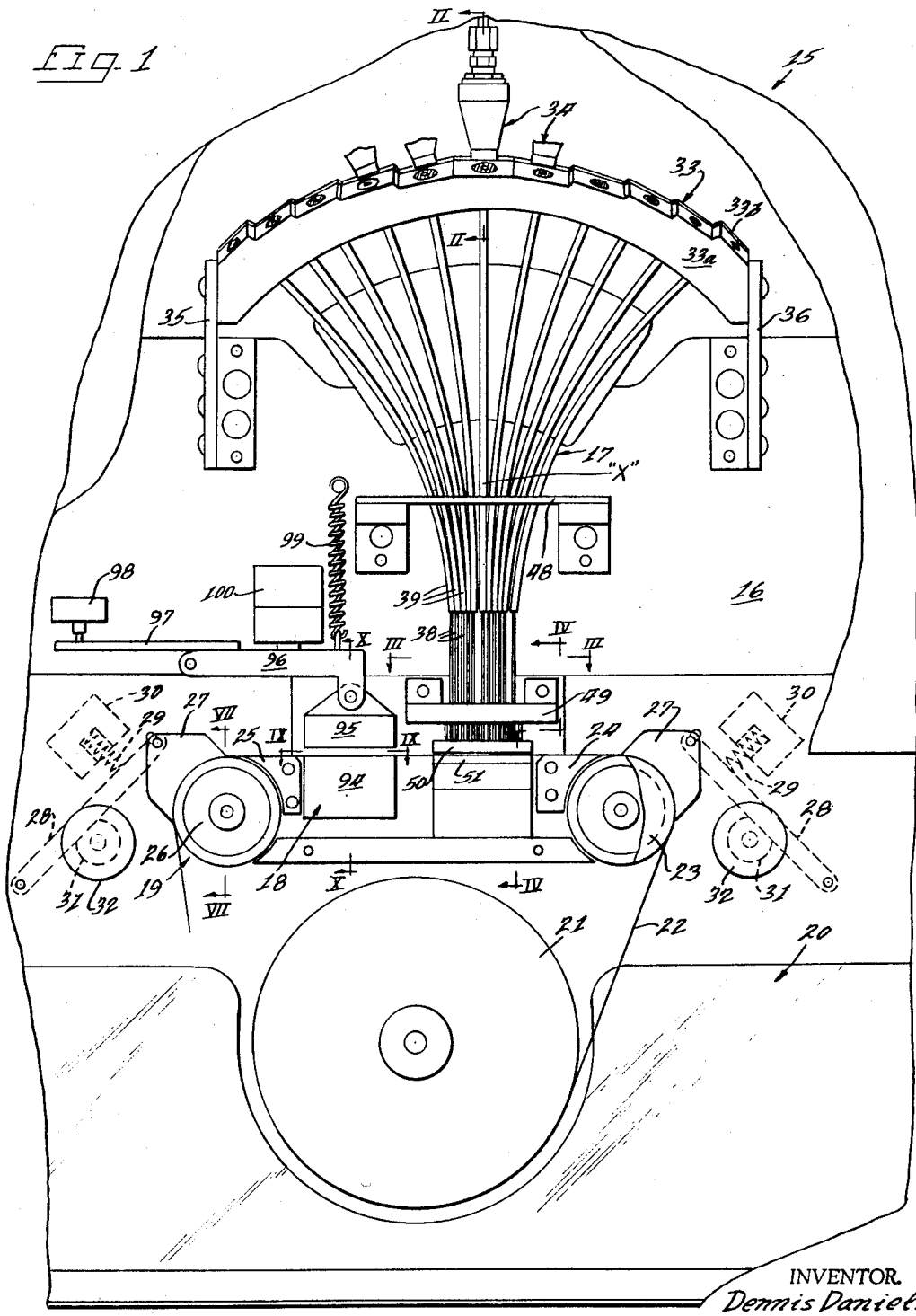
FIGURE 1 is a front elevational view, partly broken away, of a control-tape device provided in accordance with the principles of the present invention.

The principles of this invention are particularly useful when embodied in a control-tape device or attachment such as illustrated in FIGURE 1, generally indicated by the numeral 15. The control-tape device 15 includes a base 16 on which is supported a punching device 17, a tape reading mechanism 18, and an intermittent tape drive mechanism 19. The device 15 preferably also includes a storage bin 20 for perforated tape advancing to the intermittent tape drive mechanism 19, or discharged therefrom, which tape may, if desired, be looped to form a continuous loop. Within the storage bin 20 there is also preferably disposed a storage or supply reel 21 from which unperforated tape may be withdrawn as at 22.

The tape is guided over a pulley 23 and is directed therefrom over a spacer 24 through the punching device 17 which constitutes a tape perforating mechanism, thence through the tape reading mechanism 18, thence over a second spacer 25, and thence about a drive pulley 26. The drive pulley 26 is provided with sprocket teeth (not shown) that register with sprocket holes in the tape. To hold the tape against each of the pulleys 23, 26, there is provided a block 27 which is pivoted to one end of a lever 28, the other end of which lever is pivoted to the base 16. A spring 29 acts between a spring retainer 30 and the lever 28 to urge the block 27 toward the pulley 23 or 26. To lift the block 27 for admitting or threading the tape in the first instance, a cam 31 having a flat surface engaging one side of the lever 28 is pivotally supported on the base 16 and is provided with a knob 32 by which the lever and hence the block may be raised.

The intermittent tape drive mechanism 19 acts through the drive pulley 26 to advance the tape incrementally, and at each incremental position thereof, the tape perforating mechanism 17 provides an appropriate set of perforations in the tape. If the tape be perforated prior to its being threaded through the mechanism, the tape perforating mechanism 17 is disabled, and each set of encoded perforations is analyzed by the tape reading mechanism 18. Ordinarily, either the punching mechanism 17 or the reading mechanism 18 will be used to respectively encode or decode a tape.

The device 15 may be employed with the punching mechanism 17 driven by one machine and perforating the tape, and with the reading mechanism one or two increments later reading and decoding the tape perforations for control of a second machine. In every instance where the punching device 17 is employed, the tape produced becomes a permanent record of how the machine which was driving it was operated, such tape being storable for any future use.

Punching device 17

Figure 6:
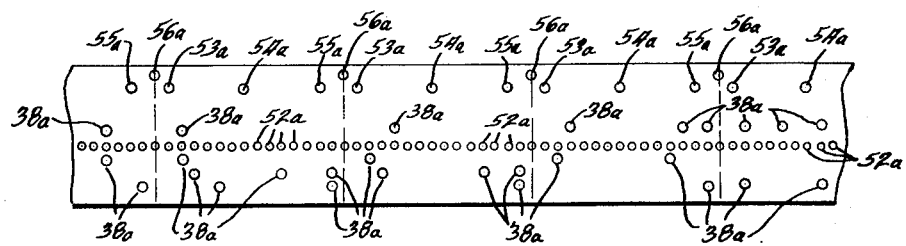
FIGURE 6 is a plan view of a portion of tape perforated or encoded by the mechanism of FIGURES 3 and 4.

The punching device 17, as shown in FIGURE 1, is further illustrated in FIGURES 2–5, the same being adapted to produce a tape such as shown in FIGURE 6.

The punching device 17 includes support means 33 adapted to support a number of fluid pressure actuated punches 34. The support means 33 comprises four arcuate blocks 33a–33d, each identical to each other, and also having converging front and rear sides. The individual support members or blocks 33a–33d are jointly supported at their ends by a pair of brackets 35, 36 secured to the base 16. In this embodiment, each of the support members 33a–33d is provided with eleven openings having axes converging substantially at the point "X," the point of convergence being substantially the same for all forty-four such openings. Each of the openings is threaded and receives and supports one of the fluid pressure actuated punch assemblies 34 at the driven end thereof.

Figure 2:
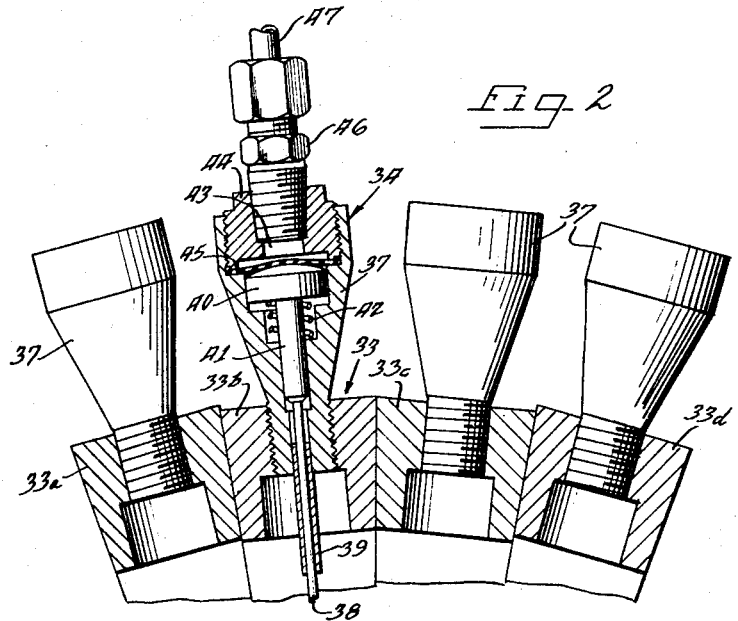
FIGURE 2 is an enlarged cross-sectional view taken along line II—II of FIGURE 1, partially broken away, illustrating the structure of a punch actuator.

As best seen in FIGURE 2, each of the punch assemblies 34 includes a housing 37 threaded into one of the openings of the support means 33 and supported thereby. Concentric with such opening, there is an elongated flexible punch 38 encased in a deformable guide sleeve 39 which is secured at its upper end to the housing 37. To the upper end of the flexible punch 38, there is secured a drive button 40 having a shank 41 attached to the flexible punch 38, the punch 38 being urged in a retracted or raised direction by a spring 42 acting between the housing 37 and the head 40. The head 40 is disposed in a recess adjacent to a pressure chamber 43 defined by a plug 44 and a diaphragm 45, the chamber 43 communicating through a fitting 46 and line 47 with a source of fluid pressure. Whenever fluid pressure is applied to the line 47, the diaphragm 45 is deflected downwardly, thereby forcing the button 40 in a downward direction and driving the flexible punch 38 by a predetermined amount at which time movement of the button 40 is arrested.

The various fluid actuated punch assemblies 34 are identical to each other and are interchangeable with each other. When one of them is supported near the center of the support means, as shown in FIGURES 1 and 2, there is relatively little deflection of the punch. However, at the ends of the support means 33, a somewhat greater deflection is imparted to the various punches 38 and guide sleeves 39, all as shown in FIGURE 1. Upon removal of the plug 44 and diaphragm 45, the button 40 and its associated flexible punch 38 may be withdrawn from the housing 37 for replacement, it being preferable that all such punches be interchangeable with each other.

As best seen in FIGURE 1, the guides 39 extend through a rigid guide member 48 and preferably are secured thereto, the guide member 48 being secured to the base 16. The lower ends of the punches 38 extend from the guides 39 and jointly comprise a group of closely spaced individually reciprocable flexible punches. The lower or working ends of the flexible punches 38 pass through a second rigid member 49 into a reciprocable guide and stripper member 50 secured in spaced relation to a perforated die 51. Although the axes of the driven ends of the punches 38 converge together at a common point, yet the punches are arcuately deflected so that their working ends pass through the rigid member 49 in parallel relation to each other, and so that the functional distance between the various perforations in the die 51 and the corresponding position on the support means 33 is uniform for all of the various fluid pressure actuated punch assemblies 34.

Figure 3:
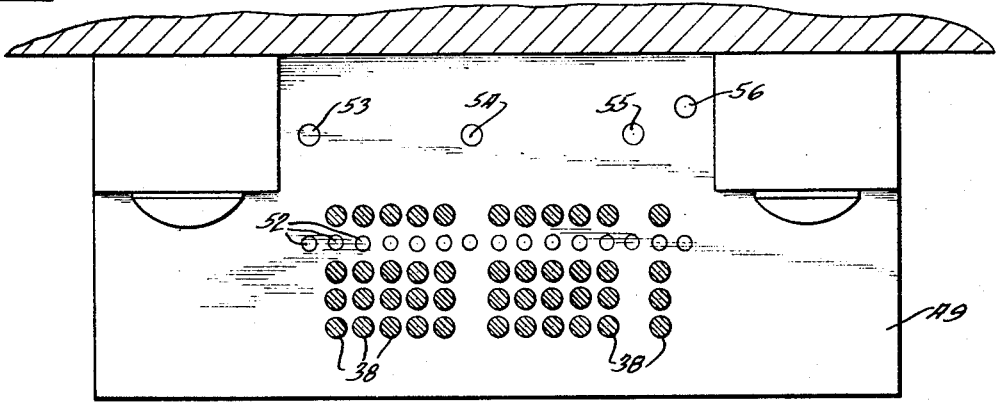
FIGURE 3 is an enlarged cross-sectional view taken along line III—III of FIGURE 1 showing an advantageous punch arrangement.

Referring to FIGURE 3, the lower rigid guide member 49 is viewed from above, each of the flexible punches 38 being shown in cross-section, such cross-sections illustrating thus the hole pattern which would be produced if all of the reciprocable punches 38 were driven through a particular increment of tape. The lower rigid member 49 also supports a series of fifteen punches 52 which are secured thereto as by brazing, and a further set of four punches 53, 54, 55, and 56. The rigid or fixed punches 52–56 all operate on every increment of the tape, the punches 52 providing a continuous row of sprocket holes, and the punch 56 defining the end limits of adjacent frames or increments set apart from each other in FIGURE 6 by dashed lines. The punches 53, 54, and 55 serve to further subdivide the arrangement of the flexible punches 38 into three sub-groups as shown to facilitate visual reading of the tape. By way of example, the punches 38 may provide holes between the punches 53 and 54 which collectively comprise one axis such as the "X" axis, the punches 38 between the punches 54 and 55 jointly providing holes corresponding to the "Y" axis, and the punches 38 between the fixed punches 55 and 56 comprising a group of control indications.

To produce a typical tape such as shown in FIGURE 6, and since the punches 52–56 are fixed, it is necessary that the die 51 be reciprocable.

As shown in FIGURE 4, the die 51 is secured to a slide 57. The guide and stripper member 50 has a lower surface 58 which is disposed in spaced relation to the upper surface of the die 51, the member 50 being secured to the reciprocable die 51. The slide 57 is slidably guided between a pair of gibs 59, 60 secured to the base 16. An actuator 61 acts between the slide 57 and a support bracket 62. The actuator 61 includes cylinder sections 63, 64 clamped together by a pair of screws 65 against a diaphragm 66, the cylinder sections 63, 64 being secured as by a pair of screws 67 to the slide 57. Thus a pair of non-communicating chambers 68, 69 are defined within the cylinder sections 63, 64, the chamber 68 communicating with a pressure line 70, and there being a piston 71 disposed in the other chamber section 69, the piston 71 having a rod 72 projecting outwardly therefrom and abutting the support bracket 62. An adjustable stop 73 limits the downward movement of the cylinder sections 63, 64, such downward movement being produced by gravity aided by a spring 74 acting through a bolt 75 between the support bracket 62 and the lower cylinder section 64. The support bracket 62 is secured as by screws to the gibs 59 and 60.

When fluid pressure is admitted to the chamber 68, the cylinder portion of the actuator 61 is pushed upwardly, thereby raising the slide 57 and thereby also moving the die 51 into a cooperation with the punches 52–56, and with such of the punches 38 as are in an extended lowered position.

When the die 51 is in its lowered position, the various punches 38 have a lower end or cutting edge which is always disposed above the surface 58. As drawn, the guide member 50 and the die 51 are in a lowered position. Reciprocation of any one of the group of reciprocable punches 38 will not cause its working end to extend into the tape-receiving space between the member 50 and the die 51. However, when the die 51 is in an upper position, appropriate punching coaction will occur between the die 51 and only such of the punches 38 as are in an extended or lowered position. As constructed, the upper position of the die 51 constitutes the extended position thereof.

Punchings or slugs are discharged from the die openings in the die 51 through a chute 76 into a container or collector 77 removably secured as by releasable means 78 to reciprocate with the die 51.

It is to be understood that the working ends of all of the punches 38 and 52–56 are disposed in the stripper member 50, whether the flexible punches 38 are retracted or extended, whenever the die 51 is retracted. This insures that the tape or workpiece may pass freely through the tape or workpiece space above the die 51. This condition is established whenever the tape is to be moved, and whenever only reading is to take place. Thus, the sole time that the flexible punches 38 and die 51 can coact is when the punches 38 are extended downwardly and the die 51 is extended upwardly. On the other hand, the punches 52–56 coact with the die 51 each time that the die 51 is extended upwardly.

Before the tape reaches the punching mechanism 17, it is ordinarily imperforate and increments of such tape are thus advanced by the drive mechanism 19 to the punching mechanism 17. At the punching mechanism 17, for each position of the tape, each time that the die 51 is reciprocated, the fixed punches coact therewith and produce the holes shown in FIGURE 6 and identified by the numbers of the punches followed by the suffix letters a.

Intermittent tape drive mechanism 19

The intermittent tape drive mechanism 19 includes a sprocket drive pulley 26 also shown in FIGURE 7. The pulley 26 is mounted corotatably on a shaft 79. A ratchet wheel 80 and a larger wheel 81 are also corotatably carried on the shaft 79. A pawl 82, shown in FIGURE 8, is pivotally supported on a drive member 83 which is rockable about the shaft 79 in response to operation of a fluid actuator 84 acting on the member 83 through a link 85. When the actuator 84 is retracted, tension is applied to the link 85 which pivots the drive member 83 as shown in FIGURE 8 in a clockwise direction, thereby effecting a driving connection between the pawl 82 and the ratchet wheel 80, thereby imparting a rotation to the shaft 79 in a clockwise direction, such direction appearing in FIGURE 1 as being a counterclockwise direction. To limit inertial overtravel, and to preclude reverse rotation of the sprocket pulley 26, a friction member 86 acts on the wheel 81 to provide a drag thereto which is maintained substantially constant by means of a spring 87 acting between a thumbscrew 88 and a plate 89 which supports the friction means 86. The drive member 83 has an extension 83a which has oppositely directed surfaces respectively engageable with a pair of adjustable stops 90, 91. If desired, the extension arm 83 may also be employed to actuate limit switches 92, 93 which serve as interlocks in the circuit to prevent other components from operating until the indexing steps have been completed.

Tape reading mechanism 18

As best seen in FIGURE 1, the tape reading mechanism 18 includes a perforated reading head 94, a pneumatic manifold 95 pivotally supported on a lever 96 and having an extension 97 for operating a limit switch 98, a spring 99, and an actuator 100 for raising and lowering the manifold 95 by pivoting the lever 96.

As seen in FIGURES 9–11, pressurized air is admitted into an inlet 101 for passing into a distribution chamber 102 which communicates with a series of downwardly directed openings having an arrangement such as shown in FIGURE 9, it being identical to that of the working ends of the reciprocable punches 38. The perforated reading head block 94 has similarly arranged perforations which communicate by means of pressure lines 103 with a number of pressure switches 104. Thus, air may pass from the distribution chamber 102 through the perforations in the manifold 95, through a corresponding perforation in the tape and through a corresponding passage in the reading head block 94, thence through one of the lines 103 to the corresponding pressure switch 104. In this embodiment, there are forty-four pressure switches 104, one corresponding to each of the possible perforation locations.

Each individual pressure switch 104 is constructed as shown in FIGURE 11. This device includes a housing 105 which may be constructed from the same blank as the housing 37, a diaphragm 106, and an annular diaphragm retainer member 107 which receives a switch assembly 108. The switch assembly 108 includes a pair of single-pole double-throw switches 109, 110 carried on a bracket 111 which is secured to a threaded mounting bushing 112, through which a slidable plunger 113 extends, the outer end of the plunger 113 being operative on a spring lever 114 which is engageable with both of the switches 109, 110. The threaded mounting bushing 112 is threadably engaged with the annular retaining member 107, with the plunger disposed to engage the diaphragm 106.

The various pressure switches 104 are supported on a support means 115 which is identical to the support means 33, the support means 115 being secured by a pair of brackets 116 to a horizontal extension 117 of the base 16. The support means 115 comprises four separate mounting blocks 115a, 115b, 115c, and 115d, each of which is respectively identical to each other and to the blocks 33a–33d. Thus, the support means 115 for the pressure switches 104 supports them in a manner so that the switch axes converge and are disposed a uniform functional distance from the perforated reading head 94. Not only is an economy of manufacture thus attained, but the functional length of the pressure lines 103 is a constant so that no variation in reaction time is produced as a result of the physical arrangement of the various switches 104.

Referring to FIGURE 12, there is shown a respresentative schematic diagram of the functional interrelationship between various elements of this invention, as applied to a multiple function machine. For purposes of simplicity, only one machine function and one flexible punch have been included, together with the corresponding reading channel and one other reading channel not associated with the machine function illustrated, directly.

A typical machine tool may include a number of separately operable functions, one of which is typified by a double-acting fluid actuator 118 having a cylinder 119 defining a chamber 120. The actuator 118 includes a piston 121 having a rod 122 connected to an element 123 to be moved relatively to the cylinder 119. The chamber 120 communicates with a comparatively low pressure source of fluid pressure 124 here indicated as being a pump, and with a relief valve 125. The opposite side of the chamber 120 and piston 121 communicates with a relatively higher source of fluid pressure 126, here indicated as being a pump, there being an electrically actuated three-way valve 127 disposed in the line 128a between the pump 126 and the actuator 118. The three-way valve 127 is under the control of a holding relay 128 or a switch 129 which are respectively controlled by a selector switch 130, a holding relay 131, a manual switch 132, or a periodically cam-operated switch 133. The three-way valve 127 may be manually operated by the switch 132 when the selector switch 130 and the switch 129 are properly closed. Similarly, the three-way valve 127 may be cyclically operated by the cam switch 133. Further, with the selector switch 130 in the opposite position, the three-way valve 127 may be operated by the relay 128. Each time that the three-way valve 127 is operated, pressure enters the line 128a to overpower the force acting on the piston 121, causing the relief valve 125 to open. This constitutes one part or stroke of the illustrated machine function. Concurrently therewith, pressure enters the fluid pressure branch line 47 to actuate one of the fluid pressure actuated punches 34 to reciprocate the corresponding flexible punch 138. Upon release of the three-way valve 127, the punch 138 is retracted. Although each punch 138 reciprocates once for each machine function cycle, the unperforated portion of the tape 22 is provided with a corresponding perforation only when the selector switch 130 is a punching position, namely to the right as drawn, and when a die positioning switch 134 is closed. With the switch 134 closed, a solenoid-actuated valve 135 brings fluid pressure to the actuator 61 to raise the die 51 as already explained. Upon completion of the function, the switch 134, which may comprise contacts in the relay 131, is opened to effect retracting of the die 51.

The holding relay 131 also controls a four-way valve 136 which controls pressurized fluid leading to the intermittent drive mechanism 19 and the tape reading mechanism 18. In one position, pressurized fluid from a supply line 137 is directed to a line 138 to the actuator 84 to drive the sprocket wheel 26 in a tape-advancing direction as illustrated. When the solenoid-actuated four-way valve 136 is positioned in the opposite direction, the actuator 84 is returned and fluid is discharged from the line 139.

When it is desired to read the tape and to place the actuator 118 under the control of the tape reading mechanism 18, then the selector switch 130 is placed in its opposite position, namely to the left as drawn, to energize a solenoid valve 140. Then as the holding relay 131 cycles the four-way valve 136, when the drive mechanism is not being driven, fluid pressure is passed through a line 141 which branches to provide fluid pressure to the actuator 100 and also to the inlet 101 to the manifold chamber 102. A typical pressure for this purpose is 25 p.s.i. This pressure passes through a tape perforation into one of the lines 103 to the associated pressure switch 104, one switch portion 110 of which completes the circuit to the holding relay 128. This is accomplished by normally open contacts in the switch 110 being closed by such increase in pressure. These contacts are preferably disposed in a holding circuit so that if pressure to the line 103 is immediately released, the tape "reading" will be remembered and the solenoid actuated three-way valve 127 will remain energized. When the next increment of tape is read, if there is a similar perforation present, pressure will again be applied, but this time no change in the position of the holding relay 128 will take place. However, the pressure will serve to prevent opening of the associated switch element 110.

If the next tape increment lacks a corresponding hole, the holding circuit of the relay 128 will be opened as follows. Each tape increment includes in its hole pattern one hole which is present in every frame. This hole registers with a line 103s which leads to a pressure-actuated switch 104s which is set to operate at a higher pressure than the previously described switch 104, and which includes normally closed contacts for its purpose. These normally closed contacts are connected in the holding circuit of the relay 128. Thus, when pressure is applied to the line 103s, if no pressure is applied to the switch 104, the switch 104s will effect interruption of the holding circuit of the associated relay. Such operation is explained in greater detail in the following paragraph.

Assume that the switch sections 109 and 110 of the switch 104 are connected in parallel and that the switch 104 closes when the pressure is raised to 10 p.s.i. or higher. Assume further that the switch sections 109 and 110 of the switch 104s are connected in parallel to each other and that the switch 104s is normally closed, and will open at a higher pressure than that used to operate the switch 104, such as 15 or 20 p.s.i. Pressure will be applied only to such lines 103 as register with a tape perforation in each frame. Pressure will be applied to the line 103s each time, since there is a corresponding tape perforation, made either by a fixed or a retractible punch. When the manifold 95 is brought to bear against the tape 22, pressure begins to build up in both the line 103 and the line 103s. When the pressure reaches 10 p.s.i., the switch 104 is actuated to operate the relay 128 which remains closed by virtue of a holding circuit within the same. This holding circuit includes the switch 104s which is also still closed. Pressure continues to build up until the switch 104s is operated, such as at fifteen or twenty pounds, thereby opening the holding circuit. Such opening has no effect since the switch 104 is still closed and is maintaining the relay 128 in operating condition. Thereafter, as the pressure is decreased, the switch 104s recloses, re-establishing the holding circuit while the switch 104 is still closed, and then the switch 104 is opened when the pressure falls below 10 p.s.i. With the manifold 95 thereafter raised and both the lines 103 and 103s vented to atmosphere, the switch 104 is restored to an open position and the switch 104s is thus at a closed position. However, the holding relay 128 is now energized so that the associated pressure line 128a remains pressurized.

If the next frame is identical so far as the illustrated line 103 and the line 103s is concerned, an increase and decrease of pressure therein cause no change in the position of the three-way valve 127, and hence cause no change in the position of the actuator 118, this much of the circuit "remembering" its previous instruction.

Assume that the next frame of the tape 22 is not perforated at the illustrated line 103. Pressure then builds up only in the line 103s until it reaches the operating pressure of the switch 104s located in the holding circuit of the holding relay 128, at which time the switch 104s opens and causes the holding relay 128 to open, thereby restoring the three-way valve 127 and hence the actuator 118 to an opposite position. The various switches 104 may be termed "add" switches, and the switch 104s may be termed a "subtract" switch, only one subtract switch being needed for all the "add" switches.

If it is desired to employ the cam-operated switch 133, it would be operated at such a rate that the slowest function would necessarily have been completed within the duration of one cycle of such cam-operated switch. By way of example, the cam thereof may rotate at 12 r.p.m. if the slowest function to be controlled will be completed in less than five seconds.

Although various minor modifications might be suggested by those versed in the art, it should be understood that I wish to embody within the scope of the patent warranted hereon all such embodiments as reasonably and properly come within the scope of my contribution to the art.

I claim as my invention:
1. A control-tape device including:
  (a) a base;
  (b) a tape perforating mechanism carried by said base;
  (c) a tape reading mechanism responsive to tape perforations, and carried by said base;
  (d) a single intermittent tape drive mechanism carried by said base and operative to advance a tape through both said perforating and reading mechanisms; and
  (e) means for selectively alternatively rendering only one of said tape perforating and reading mechanisms entirely inoperative on the tape advanced therethrough by said drive mechanism.

2. A punching device, comprising:
  (a) a group of individually extendible and retractible flexible punches each having a driven end and a working end;
  (b) means supporting the driven ends of said punches in such manner that the axes of the driven ends converge together;
  (c) a die having die openings for the working ends of said punches; and (d) a guide member having a surface disposed in spaced relation to said die and defining a space therebetween receptive of a workpiece, said member having apertures guiding the working ends of said flexible puches into alignment with said die openings.

3. A punching device, comprising:
(a) a group of individually extendible and retractible flexible punches each having a driven end and a working end;
(b) means supporting the driven ends of said punches in such manner that the axes of the driven ends converge together;
(c) a die having die openings for the working ends of said punches; and
(d) a guide member having a surface disposed in spaced relation to said die and defining a space therebetween receptive of a workpiece, said member having apertures guiding the working ends of said flexible punches into alignment with said die openings,
(e) said die openings being disposed a uniform functional distance from the corresponding positions on said support means to enable interchanging said flexible punches.

4. A punching device, comprising:
(a) a group of punches having working ends directed in a common direction, certain of said punches being individually selectively extendible and retractible;
(b) a reciprocably driven die having die openings registering with said working ends and coactive therewith;
(c) a fixed member guiding the working ends of said certain of said punches, and fixedly supporting the other of said punches, and
(d) a stripper member secured to said die and having a surface disposed in spaced relation to said die and defining a space therebetween receptive of a workpiece.

5. A control-tape device, including:
(a) a base;
(b) a group of individually extendible and retractible flexible punches each having a driven end and a working end;
(c) first means carried by said base and supporting the driven ends of said punches in such manner that the axes of the driven ends converge together;
(d) a die having die openings for the working ends of said punches;
(e) a guide member having a surface disposed in spaced relation to said die and defining a space therebetween receptive of a control tape, said member having apertures guiding the working ends of said flexible punches into alignment with said die openings;
(f) said die openings being disposed a uniform functional distance from the corresponding positions on said support means to enable interchanging said flexible punches;
(g) a tape reading mechanism responsive to tape perforations and including a perforated reading head carried by said base and connected by a group of pressure lines to a group of pressure switches;
(h) second means carried by said base and supporting said pressure switches in such manner that the axes of said switches converge together and that said pressure lines have a uniform functional length; and
(i) a single intermittent tape drive mechanism operative to advance a tape through both said space and said reading head.

6. A control-tape device for a multiple function machine tool, each function of which machine tool is characterized by the presence or absence of a fluid pressure, comprising:
(a) a group of fluid pressure-actuated punches;
(b) means for respectively fluidly connecting said punches to sense the several fluid pressures associated with the multiple functions of the machine tool for effecting reciprocation of said punches; and
(c) an intermittent tape drive mechanism operative to advance each of successive increments of tape into registration with said group of punches.

7. A punching device comprising:
(a) a group of punches having working ends directed in a common direction, certain of said punches being individually selectively extendible and retractable;
(b) a die reciprocably driven with respect to said punches and having die openings registering with said working ends and coactive therewith; and
(c) a fixed member guiding the working ends of said certain of said punches, and fixedly supporting the other of said punches, said other fixed punches and said certain extended punches being simultaneously active upon a workpiece in response to reciprocation of said die.

8. A control-tape punching device, comprising:
(a) a group of punches having working ends directed in a common direction, certain of said punches being individually selectively extendible and retractable, and other of said punches being fixed and arranged to define a frame pattern within which said certain punches are disposed, for providing a repetitive hole pattern in the control tape by which the holes made by the selected punches may be identified as comprising one control frame on the tape;
(b) a fixed member supporting said other punches; and
(c) a reciprocably driven die having die openings registering with said working ends and coactive simultaneously with the working ends of said certain extended punches and the working ends of said fixed punches.

References Cited

UNITED STATES PATENTS

| | | | |
|---|---|---|---|
| 2,614,632 | 10/1952 | Clos | 235—61.113 |
| Re. 21,133 | 6/1939 | Lake | 234—28 |
| 2,453,239 | 11/1948 | Luhn | 200—46 |
| 2,824,182 | 2/1958 | Lambert | 200—46 |
| 1,623,748 | 4/1927 | Pfannenstiehl | 178—17 |
| 1,902,064 | 3/1933 | Ford | 235—61.11 X |
| 2,011,588 | 8/1935 | Morris. | |
| 2,293,077 | 8/1942 | Potts. | |
| 2,354,549 | 7/1944 | Rindfleisch. | |
| 2,425,490 | 8/1947 | Pitman | 234—107 |
| 2,550,079 | 4/1951 | Mixer. | |
| 2,563,290 | 8/1951 | Thomas et al. | |
| 2,705,105 | 3/1955 | Paschen | 234—107 |
| 3,083,898 | 4/1963 | Ives et al. | 234—34 |

DARYL W. COOK, Primary Examiner

U.S. Cl. X.R.
234—42, 107